United States Patent [19]

Grenier et al.

[11] Patent Number: 5,855,862
[45] Date of Patent: Jan. 5, 1999

[54] PROCESS FOR THE PREPARATION OF AN OXIDE, ESPECIALLY A TRANSITION METAL OXIDE

[75] Inventors: Jean-Claude Grenier, Cadaujac; Jean-Pierre Doumerc, Gradignan; Stephane Petit, Chatel Guyon, all of France

[73] Assignee: Rhone-Poulenc Chimie, Courbevoie Cedex, France

[21] Appl. No.: 727,673

[22] PCT Filed: Feb. 16, 1996

[86] PCT No.: PCT/FR96/00260

§ 371 Date: Jan. 8, 1997

§ 102(e) Date: Jan. 8, 1997

[87] PCT Pub. No.: WO96/25359

PCT Pub. Date: Aug. 22, 1996

[30] Foreign Application Priority Data

Feb. 17, 1995 [FR] France ..................... 95 01874

[51] Int. Cl.[6] ............. C01B 13/14; C01G 1/02; C01G 31/02; C01G 41/02
[52] U.S. Cl. ............ 423/592; 423/593; 423/594; 423/595; 423/598; 423/599; 423/600; 423/604; 423/605; 423/606; 423/607; 423/608; 423/609; 423/610; 423/617; 423/618; 423/622; 423/624; 423/625; 423/631; 423/632; 423/633; 423/635; 423/639; 423/643
[58] Field of Search ................. 423/592, 593, 423/594, 595, 598, 599, 600, 604, 605, 606, 607, 608, 609, 610, 617, 618, 622, 624, 625, 631, 632, 633, 635, 639, 643

[56] References Cited

U.S. PATENT DOCUMENTS 3,410,652 11/1968 Hausen et al. .
4,339,424 7/1982 Jacobson .
4,486,400 12/1984 Riley .

OTHER PUBLICATIONS

JAPIO Patent Abstracts of Japan, Abstract No. JP354079152A which is an abstract of Japanese Patent Specification No. 54–079152 (Jun. 1979).
JAPIO Patent Abstracts of Japan, Abstract No. JP359023805A which is an abstract of Japanese Patent Specification No. 59–023805 (Jul. 1984).
WPIDS Abstract No. 84–218506 which is an abstract of Soviet Union Patent Specification No. 1066747 (Jan. 1984).
Chemical Abstract No. 121:140387 which is an abstract of an article by Tamaki et al entitled "Grain Size Effects . . . Oxides", J. Electrochem Soc. 141(8) 2207–10 (1994).
Chemical Abstract No. 124:214391 which is an abstract of an article by Kudo et al entitled "Lithiuk Intercalation . . . Vanadium Oxide", J. Electrochem Soc. 95–22 (1996).
Chemical Abstract No. 125:343990 which is an abstract of an article by Livage entitled "Sol–Gel Chemistry . . . Vanadium Oxide Gels", Solid State Ionics, 86–88 (Pt. 2) (1996).
Database WPI, Week 7711, Derwent Publications ltd., London, GB; AN 77–19009y & JP–A–52 014 597 (Nippon Chem ind KK), 3 Feb. 1977.
Database WPI, Week 8447, Derwent Publications Ltd., London, GB; AN 84–293792 & SU–A–1 084 327 (AS Kaza Metal Conc), 7 Apr. 1984.

*Primary Examiner*—Anthony Green
*Attorney, Agent, or Firm*—Burns, Doane, Swecker & Mathis, L.L.P.

[57] ABSTRACT

A method for preparing an oxide (P), which includes the steps of (i) forming a solid phase compound (O) based on an oxide containing molecular entities (1) chosen from optionally substituted ammonium, diammonium, diazan-ium or diazandium, the entities being distributed within the solid matrix, and (ii) eliminating the entities (1) from the solid phase compound (O) by reacting the solid phase compound (O) with a gaseous stream containing a break-down reactant for the entities (1), and isolating the resulting solid material (P).

21 Claims, No Drawings

PROCESS FOR THE PREPARATION OF AN OXIDE, ESPECIALLY A TRANSITION METAL OXIDE

The present invention relates to a process for the preparation of an oxide.

Inorganic oxides and especially transition metal oxides are employed in particular in the field of heterogeneous catalysis, either as inert support for catalyst or as catalyst in its entirety. Their crystal structure is often exploited in order to act as a molecular sieve.

For example, the use of zeolites which develop a crystal structure with internal channels may be mentioned. The control of the channel size provides access to specific catalysts with substrates of given size.

Access to oxides which generally have a crystal structure or a (nano)porosity which is controlled represents a considerable objective, insofar as it offers a hope of widening the field of the applications of known compounds.

The aim of the present invention is thus to propose a new access route to oxides of novel or modified structure or texture by means of simple operations making use of mild chemistry.

To this end, the subject-matter of the invention is a process for the preparation of an oxide (P), according to which (i) a solid compound (O), for example crystalline, is formed, based on an oxide containing molecular entities (1) consisting of ammoniums, diammoniums, diazaniums or diazanediums, which are substituted or otherwise, distributed within the lattice of the solid, then (ii) the entities (1) are removed from the solid (O) by reacting the compound (O) in solid phase with a gas stream including a reactant for decomposing the entities (1), and the resulting solid (P) is isolated.

The entity (1) preferably corresponds to one of the following formulae (1a), (1b) and (1c):

  (1a)

  (1b)

  (1c)

in which each of $R^1$, $R^2$, $R^3$, $R^4$, $R^5$ and $R^6$, which are identical or different, denotes a hydrogen atom or an alkyl, cycloalkyl or aryl radical, generally $C_1$–$C_7$.

The molecular entity (1) may thus be, for example, an $^+NH_4$ ion, an $^+N_2H_5$ ion or an $^{2+}N_2H_6$ ion.

Under the effect of the decomposition reactant the molecular entities (1) are converted into reaction products which can be easily removed from the solid which has reacted. Advantageously, a reactant which decomposes the entities (1) into light or volatile compounds which can be entrained by the said gas stream will be employed.

During stage (ii) the oxide (O) is therefore freed from the inclusions of formula (1), so that the resulting oxide (P) which is isolated is at least partially, preferably completely, free from entities (1).

Depending on the nature and the size of the radicals which it contains, the entity (1) is more or less bulky and the inclusion of this entity in the compound (O) imposes structural parameters which are a function of this bulkiness. The removal of the entity (1) from (O) by decomposition leaves more or less large unoccupied spaces in the lattice.

The characteristics of the final oxide (P) can therefore be controlled through the choice of the entity (1) which is present in the oxide (O).

The process according to the invention can be applied to the preparation of an oxide of at least one element which has a mixed valency.

The process according to the invention is preferably applied to the preparation of an oxide of at least one element (E) chosen from the group made up of true metals, transition metals and metalloids.

True metals are here intended to mean the metals of groups IA and IIA of the Periodic Classification of the elements. Sodium, potassium, rubidium, magnesium, calcium and strontium may thus be mentioned in particular.

The lanthanides and the actinides, which constitute internal transition elements, are contained within the transition metals as referred to above. Internal transition elements which may thus be mentioned are cerium, praseodymium, neodymium, samarium, europium, terbium, dysprosium, thulium, ytterbium, uranium, neptunium and plutonium.

Metalloids are intended in particular to mean the elements of group IV B, such as silicon, tin and lead, of group V B, such as phosphorus, arsenic, antimony and bismuth, of group VIB such as sulphur and tellurium, and of group VIIB, such as iodine.

The process according to the invention is advantageously applied to the preparation of an oxide of at least one transition metal. Any transition metal may be used and it may thus be chosen from the elements of groups IIIA, IVA, VA, VIA, VIIA, VIII, IB and IIB of the Periodic Classification of the elements.

This transition metal may be chosen more particularly from titanium, vanadium, chromium, manganese, iron, copper, molybdenum, tungsten and the lanthanides (such as, especially, cerium, praseodymium and terbium).

The process according to the invention can be applied to the preparation of a simple oxide (that is to say an oxide containing only one such element as mentioned above) or of a mixed oxide (that is to say an oxide containing more than one such element as mentioned above).

The molecular entity (1) is preferably the ammonium ion $^+NH_4$.

The decomposition reactant employed may be a nitrogen oxide (optionally mixed with oxygen), such as nitrogen monoxide, nitrogen dioxide or a mixture of these.

Nitrogen dioxide is advantageously employed. During stage (ii) the entity (1) imprisoned in the lattice of (O) is therefore decomposed, releasing especially nitrogen and water, which are removed by the gas stream. The reaction of the ammonium ion within an oxide (O) with nitrogen dioxide thus follows the following equation:

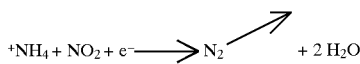

This reaction can take place over a vast range of temperature, especially from 15° to 500° C. Part of the water formed may optionally remain present in the solid (P).

According to one type of arrangement of the species in the oxide (O) the entities (1) may be bonded to oxygen atoms of the lattice (for example crystal lattice), by ionic bonding. The structure of the oxide (O) is organized around the entities (1).

A simple example of such an oxide (O) is ammonium vanadate of formula $NH_4VO_3$, which is an ammonium salt derived from vanadic anhydride $V_2O_5$.

The entities (1) present in the oxide (O) are preferably inserted in the free space inside a crystal lattice unit.

The oxide (O) advantageously contains at least one element (E), especially at least one transition metal, with a number of different oxidation states, and the number of entities (1) is linked with the number of atoms of elements (E), especially of transition metal, of lower oxidation state.

In this case the reactant for decomposition of the entity (1) is advantageously an oxidizing reactant, so that the decomposition reaction is accompanied by an oxidation of the atom of the element (E), especially of transition metal. A suitable reactant gas of this type is a nitrogen oxide (optionally mixed with oxygen), such as nitrogen monoxide, nitrogen dioxide or a mixture of these. Nitrogen dioxide $NO_2$ is preferably employed.

In the final oxide (P) the element (E), especially the transition metal, is then in an oxidation state which corresponds to a higher or maximum oxidation state of the said element, especially of the said metal, in the oxide (O).

Such oxides (O) can be prepared by reaction of an oxide (N) of element (E), especially of transition metal, with a reducing agent, in the presence of a source of entities (1), especially of a salt of entities (1).

Alternatively, the oxide (O) can be prepared by reaction of an oxide (N) of element (E), especially of transition metal, which contains entities (1) bonded to oxygen atoms of the lattice by ionic bonding, with a reducing agent. The oxide (N) then acts as a source of entities (1). The lattice of atoms of oxygen and of element (E), especially of metal, of (N) is reorganized, in particular in respect of the entities (1). An "external" source of entities (1), especially a salt of entities (1), may, of course, be additionally employed.

The reducing agent may be of any known type. Those preferably employed are gaseous hydrogen (undiluted or diluted in an inert gas such as argon), an alkali metal, especially sodium, borohydride or else a metal which is more reducing than the element (E) to be reduced, especially the transition metal to be reduced, for example zinc.

A subject-matter of the present invention is more particularly a process for the preparation of tungsten oxide, in which (i) ammonium paratungstate $(NH_4)_{10}W_{12}O_{41} \cdot 5H_2O$ is placed in contact with a reducing agent as described above in order to prepare an intermediate tungsten oxide of formula (2) $(NH_4)_xWO_3$ where x is a real number from 0.06 to 0.33, in particular from 0.11 to 0.15, then (ii) the intermediate oxide of formula (2) is reacted in solid phase with a stream of gaseous nitrogen dioxide at a temperature of 15° to 500° C., in particular from 100° to 400° C., and the resulting solid is isolated.

The resulting solid isolated is a tungsten oxide of formula $WO_3$ in a metastable form which crystallizes in the hexagonal system, as the intermediate oxide $(NH_4)_xWO_3$, with a very good degree of crystallinity.

The invention does also relate to a tungsten oxide of formula $WO_3$, which has a hexagonal symmetry and which has a crystal lattice constant a of between 14.5 and 14.8 Å and a crystal lattice constant c of between 7.6 and 7.8 Å.

Another subject-matter of the present invention is a process for the preparation of vanadium oxide, in which (i) vanadic anhydride $V_2O_5$ is placed in contact with a reducing agent as described above and an ammonium halide in order to prepare an intermediate vanadium oxide of formula (3) $(NH_4)_2V_3O_8$, then (ii) the intermediate oxide of formula (3) is reacted in solid phase with a stream of gaseous nitrogen dioxide at a temperature of between 15° and 500° C., and the resulting solid is isolated.

The reducing agent employed in stage (i) may be advantageously a highly reducing metal such as zinc. The reaction preferably takes place in aqueous solution at reflux in the presence of a large excess of ammonium chloride as a source of ammonium ions.

Alternatively, a borohydride such as sodium borohydride may advantageously be employed as reducing agent. The reaction takes place preferably in aqueous solution at ambient temperature (that is, 15° to 25° C.).

Especially when the temperature at which stage (ii) is performed is not very high, in particular between 15° and 25° C., the vanadium oxide of formula $V_2O_5$ which is prepared (this being without passing through a liquid phase) and which forms a subject-matter of the present invention is amorphous and at least partially hydrated.

The oxides (P) of particular structure which are obtained according to the present invention by removal of relatively bulky entities from a certain structure by solid/gas reaction have open and aerated structures. When the oxide (P) is a crystalline solid its open crystal structure can organize itself, forming channels or else layered structures.

Such open structures find an application especially in the field of heterogeneous catalysis, in particular for the controlled oxidation of hydrocarbons or the reduction of nitrogen oxides.

The structure of the oxides prepared by the process according to the invention is usually favourable to the insertion of cations, especially the monovalent ones like $H^+$, $Li^+$, $Ag^+$, $Na^+$ or $Cu^+$.

The oxides prepared by the process according to the invention can also be advantageously employed in the fields of energy storage (especially rechargeable batteries), of ion conductors, of inorganic pigments and of electrochromism.

The invention will be understood better with the aid of the following illustrative examples:

EXAMPLE 1 a) Preparation of Tungsten Oxide Containing Inserted Ammonium Ions $(NH_4)_xWO_3$ (1a).

10 g of ammonium paratungstate pentahydrate of formula $(NH_4)_{10}W_{12}O_{41} \cdot 5H_2O$ are placed in an oven under a stream of an argon-hydrogen reducing mixture containing 10% of hydrogen.

The temperature in the oven is raised at 2.5° C. per minute up to 350° C. This temperature is maintained for 24 h and the oven is then switched off. The temperature falls slowly to the ambient temperature over 3 to 4 hours.

The circulation of the stream of reducing gas is then stopped.

A product is obtained in the form of a fine powder, dark blue in colour with metallic reflections, which originates from the presence of mixed valencies $W^{5+}$ and $W^{6+}$ which have appeared during the reduction of the starting compound.

The product is characterized by X-ray diffraction and electron microscopy, and the fact that the product is in the form of crystals which crystallize in the hexagonal system is verified. The crystal lattice constants are reported in Table 1.

The analysis of the product by proton NMR, by mass spectrometry and by thermogravimetric analysis shows that the product corresponds to the formula $(NH_4)_xWO_3$ with x between 0.06 and 0.33.

b) Oxidation of $(NH_4)_xWO_3$ with $NO_2$ to Prepare the Oxide (1b)

The product of stage (a) is placed on a demountable sinter in a glass tube provided at one end with an $NO_2$ gas delivery and at the other end with a gas outlet emerging below the surface of a liquid intended to neutralize the oxides formed as by-products and the unreacted oxide $NO_2$.

A removable lagged oven is placed around the tube where the sinter is situated. This oven is controlled by a thermocouple measuring the temperature inside the glass tube at the sinter.

The stream of gaseous dioxide may originate from a commercial cylinder or may be produced, for example, by decomposition of $Pb(NO_3)_2$ at 250° C. upstream of the reactor tube.

The oven temperature is set at 225° C. and changes between 225° and 260° C. during 3 h 30 minutes of reaction. The product obtained is green-yellow in colour. It is analysed in the same way as the oxide (1a), to determine its formula and its crystallinity.

The product crystallizes in the hexagonal system with a very good degree of crystallinity. Measurement by X-ray diffraction shows that the crystal lattice constants of the oxide (1b), which are reported in Table 1, are larger than those of the oxide (1a).

The formula of (1b) is of the type $WO_3 \cdot yH_2O$. A portion of the water of hydration may originate from the water released by the reaction of oxidation with $NO_2$. The other portion may originate from the ambient atmosphere. Depending on the duration of exposure to air, y can vary from 0.01 to 0.10.

The oxide (1b) is a tungsten oxide of metastable form. It becomes hydrated in the presence of air, but remains in its hexagonal form up to 505° C.

The hexagonal structure of this oxide has structural channels of the order of 3 to 5 Å in diameter which can accommodate water molecules therein.

The hexagonal structure is converted irreversibly into normal monoclinic structure in air starting from 505° C.

EXAMPLE 2

The 2-stage procedure of Example 1 was repeated with the following operating modifications:

Stage a: 10 g of ammonium paratungstate pentahydrate are placed in an oven. The oven temperature is raised to 350° C. at the maximum rate of increase in temperature of the oven.

A stream of reducing mixture of argon and hydrogen containing 10% of hydrogen is then installed in the oven at 350° C. for 8 hours and the oven is then switched off.

The crystal lattice constants of the oxide (2a) $(NH_4)_xWO_3$ are shown in Table 1.

Stage b: The oven is controlled at a temperature between 250° and 270° C. and the reaction under a stream of $NO_2$ takes place for 2 h 15.

The product obtained is yellow in colour.
The crystal lattice constants are shown in Table 1.

TABLE 1

| Example | Constants of the oxide obtained in stage (a) | | | Constants of the oxide obtained in stage (b) | | |
|---|---|---|---|---|---|---|
| | a(Å) | c(Å) | (Å³)(1) | a(Å) | c(Å) | (Å³) |
| 1 | 7.317 – | 7.45 – | 345.45 | 14.680 – | 7.641 – | 1.426 |
| 2 | 7.311 – | 7.472 – | 345.95 | 14.690 – | 7.650 – | 1.430 |

1) V denotes the volume of the crystal lattice unit.

The removal in (b) of the $^+NH_4$ ions imprisoned in the oxide lattice produced in stage (a) takes place with an increase in the crystal lattice constants.

The presence of channels in the hexagonal structure of the oxide prepared enables it to be employed in the usual applications of the zeolites which have a similar structure, as molecular sieve using adsorption of small-sized molecules in the porosity of the material, or as support for elements, by exchange of chemical elements, such as metal ions, inside the channels.

This structural type is especially favourable for the insertion of monovalent cations like $H^+$, $Li^+$, $Ag^+$, $Na^+$ or $Cu^+$.

The oxide prepared can also be advantageously employed in electrochromic materials.

EXAMPLE 3 a) Preparation of $(NH_4)_2V_3O_8$ by Reduction of $V_2O_5$ in the Presence of $^+NH_4$ Ions 290 mg of zinc powder are added to 1 g of $V_2O_5$ in aqueous solution in the presence of an excess of ammonium chloride $NH_4Cl$ (15 g). The reaction takes place for 3 days in water under reflux.

X-ray diffraction and thermogravimetric analysis (TGA) establishes that the product has the formula $(NH_4)_2V_3O_8$.

Another alternative method of preparation of $(NH_4)_2V_3O_8$ is the following:

An excess of ammonium chloride $NH_4Cl$ (10 g) and 18 mg of sodium borohydride $NaBH_4$ are added to 1 g of $V_2O_5$ in aqueous solution. The reaction takes place for 3 hours at ambient temperature.

The product obtained is characterized by X-ray diffraction and it is verified that the product crystallizes in tetragonal phase with constants which are close to those reported in the literature.

b) Oxidation of $(NH_4)_2V_3O_8$ with $NO_2$.

The product from stage (a) is treated with $NO_2$ in the same apparatus as that described above.

The reaction temperature is 170° C. and the reaction under a stream of $NO_2$ takes place for 1 h 15 min. A product which is orangy-brown in colour is obtained, which is characterized by X-ray diffraction and by TGA.

It is vanadic anhydride $V_2O_5$ which is crystallized in the orthorhombic system. The crystal lattice constants are reported in Table 2, where the constants for a commercial oxide $V_2O_5$ (reference) are also shown.

EXAMPLE 4

Example 3 is repeated, Stage (b) being performed at a temperature of 20° C. for 2 h. An ochre-coloured product is obtained this time, which is amorphous both to X-rays and to electron microscattering, and hydrated.

The removal of the $^+NH_4$ inclusions at ambient temperature (Example 4) results in "the explosion" of the crystal lattice, whereas at a higher temperature, such as 170° C. (Example 3), a recrystallization makes it possible to restructure the oxide $V_2O_5$.

This process for the preparation (without passing through a liquid phase) of new amorphous $V_2O_5$ oxides, which are at least partially hydrated, also makes it possible to generate new reactive entities which find applications in the field of heterogeneous catalysis.

They can also be used for the production of positive electrodes in rechargeable lithium batteries.

TABLE 2

| Oxide | Crystal lattice constants | | | |
|---|---|---|---|---|
| | a (Å) | b (Å) | c (Å) | V(Å³) |
| Ref. | 11.539 | 3.569 | 4.387 | 180.65 |
| Ex. 3 | 11.529 | 3.567 | 4.380 | 180.12 |
| Ex. 4 | — | — | — | — |

We claim:

1. A method for preparing an oxide (P), said method comprising the steps of:
   (i) forming a solid compound (O) which comprises an oxide and one or more molecular entities selected from the group consisting of substituted or non-substituted ammoniums, diammoniums, diazaniums and diazanediums, said molecular entities being distributed within a lattice of the solid compound (O);
   (ii) reacting said solid compound (O) in solid phase with a gas stream comprising a nitrogen oxide to remove said molecular entities from the solid compound (O) and form an oxide (P); and
   (iii) isolating said oxide (P).

2. The method according to claim 1, wherein said oxide (P) is an oxide of at least one element (E) having a mixed valency.

3. The method according to claim 1, wherein said oxide (P) is an oxide of at least one element (E) selected from the group consisting of true metals, transition metals, and metalloids.

4. The method according to claim 1, wherein said oxide (P) is an oxide of at least one transition metal.

5. The method according to claim 1, wherein said oxide (P) is an oxide of a transition metal selected from titanium, vanadium, chromium, manganese, iron, copper, molybdenum, tungsten and the lanthanides.

6. The method according to claim 1, wherein said molecular entities have a formula selected from:

  (1a)

  (1b)

  (1c)

in which each of $R^1$, $R^2$, $R^3$, $R^4$, $R^5$ and $R^6$ is identical or different and is a hydrogen atom or an alkyl, cycloalkyl, or aryl group.

7. The method according to claim 1, wherein said molecular entities are selected from $^+NH_4$, $^+N_2H_5$ and $^{2+}N_2H_6$ ions.

8. The method according to claim 1, wherein said nitrogen oxide is nitrogen monoxide.

9. The method according to claim 1, wherein said nitrogen oxide is nitrogen dioxide.

10. The method according to claim 1, wherein said molecular entities are linked by ionic bonds to oxygen atoms in the lattice.

11. A method for preparing an oxide (P), said method comprising the steps of:
   (i) forming a solid compound (O) which comprises an oxide and one or more molecular entities selected from the group consisting of substituted or non-substituted ammoniums, diammoniums, diazaniums and diazanediums, said solid compound (O) containing an element (E) having a number of different oxidation states, said molecular entities being in free space inside a crystal lattice unit of said solid compound (O),
   (ii) reacting said solid compound (O) in solid phase with a gas stream comprising a nitrogen oxide to remove said molecular entities from the solid compound (O) and form an oxide (P); and
   (iii) isolating said oxide (P).

12. The method according to claim 11, wherein step (i) comprises reacting an oxide (N) of said element (E) with a reducing agent in the presence of a source of said molecular entities.

13. The method according to claim 11, wherein step (i) comprises reacting an oxide (N) of said element (E) with a reducing agent in the presence of a salt of said molecular entities.

14. The method according to claim 11, wherein step (i) comprises reacting an oxide (N) of said element (E) with a reducing agent, said oxide (N) comprising said molecular entities ionically bonded to oxygen atoms in the crystal lattice unit.

15. The method according to claim 12, wherein said reducing agent is selected from gaseous hydrogen, zinc, and an alkali metal borohydride.

16. A method for preparing tungsten oxide, said method comprising the steps of:
   (i) contacting ammonium paratungstate $((NH_4)_{10}W_{12}O_{41} \cdot 5H_2O)$ with a reducing agent to obtain an intermediate tungsten oxide of formula (2):

wherein x is a real number from 0.06 to 0.33;
   (ii) reacting the intermediate tungsten oxide of formula (2) in solid phase with a stream of gaseous nitrogen dioxide at a temperature of 15° to 500° C. to obtain a tungsten oxide solid; and
   (iii) isolating said solid tungsten oxide.

17. A method for preparing tungsten oxide, said method comprising the steps of:
   (i) contacting ammonium paratungstate $((NH_4)_{10}W_{12}O_{41} \cdot 5H_2O)$ with gaseous hydrogen to obtain an intermediate tungsten oxide of formula (2):

wherein x is a real number from 0.11 to 0.15;
   (ii) reacting the intermediate tungsten oxide of formula (2) in solid phase with a stream of gaseous nitrogen dioxide at a temperature of 100° to 400° C. to obtain a tungsten oxide solid; and
   (iii) isolating said tungsten oxide solid.

18. A method for preparing vanadium oxide, said method comprising the steps of:
   (i) contacting vanadic anhydride ($V_2O_5$) with a reducing agent and an ammonium halide to obtain an intermediate vanadium oxide of formula (3):

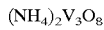

(ii) reacting said intermediate vanadium oxide of formula (3) in solid phase with a stream of gaseous nitrogen dioxide at a temperature of between 15° and 500° C. to obtain a vanadium oxide solid; and
   (iii) isolating the vanadium oxide solid.

19. A method for preparing vanadium oxide, said method comprising the steps of:
   (i) contacting vanadic anhydride ($V_2O_5$) with a reducing agent selected from zinc and an alkali metal borohydride, and an ammonium halide to obtain an intermediate vanadium oxide of formula (3):

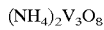

(ii) reacting said intermediate vanadium oxide of formula (3) in solid phase with a stream of gaseous nitrogen dioxide at a temperature of between 15° and 500° C. to obtain a vanadium oxide solid; and
   (iii) isolating the vanadium oxide solid.

20. A tungsten oxide of formula $WO_3$, having an hexagonal symmetry and a crystal lattice constant a of between 14.5 and 14.8 Å and a crystal lattice constant c of between 7.6 and 7.8 Å.

21. A vanadium oxide of formula $V_2O_5$, which is amorphous and at least partially hydrated.

* * * * *